United States Patent
Feyereisen et al.

(10) Patent No.: US 6,289,277 B1
(45) Date of Patent: Sep. 11, 2001

(54) INTERFACES FOR PLANNING VEHICLE ROUTES

(75) Inventors: Thea Lynn Feyereisen, Hudson, WI (US); Christopher J. Misiak, St. Anthony; Victor A. Riley, Shoreview, both of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/413,959

(22) Filed: Oct. 7, 1999

(51) Int. Cl.$^7$ .............................. G08G 5/04; G06F 19/00
(52) U.S. Cl. ......................... 701/202; 340/945; 342/109
(58) Field of Search ................................. 701/14, 24, 25, 701/26, 201, 202, 3, 301, 206, 200, 207, 4; 340/945, 947, 982, 983; 342/26, 109, 29, 455

(56) References Cited

U.S. PATENT DOCUMENTS

| | | | |
|---|---|---|---|
| 3,646,555 | * 2/1972 | Atlas | 343/5 W |
| 3,750,166 | * 7/1973 | Dearth | 343/6 TV |
| 4,649,388 | * 3/1987 | Atlas | 342/26 |
| 4,812,990 | * 3/1989 | Adams et al. | 364/444 |
| 5,550,742 | * 8/1996 | Furuya et al. | 364/449 |
| 5,615,118 | * 3/1997 | Frank | 364/424.013 |
| 5,867,805 | 2/1999 | Brown | 702/3 |
| 5,884,223 | * 3/1999 | Tognazzini | 701/301 |
| 5,936,552 | * 8/1999 | Wichgers et al. | 340/963 |
| 5,999,882 | * 12/1999 | Simpson et al. | 702/3 |

* cited by examiner

Primary Examiner—Tan Nguyen
Assistant Examiner—Dalena Tran
(74) Attorney, Agent, or Firm—John G. Shudy, Jr.

(57) ABSTRACT

A system for producing vehicle routes such as aircraft flight plans in the presence of weather and other hazards defines static and moving hazards with polygons drawn on a display containing graphic hazard regions. Different hazard types and intensities are displayed differently. Both lateral and vertical geographic depictions are displayed, and hazards can be displayed temporally as well. Users input information and thresholds for hazards.

53 Claims, 3 Drawing Sheets

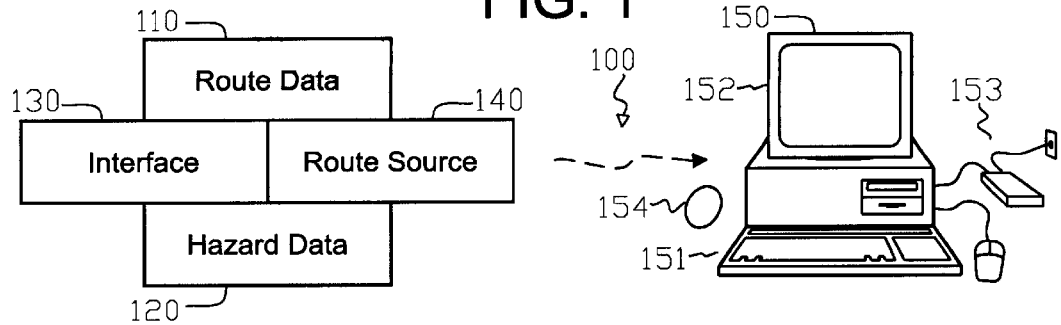
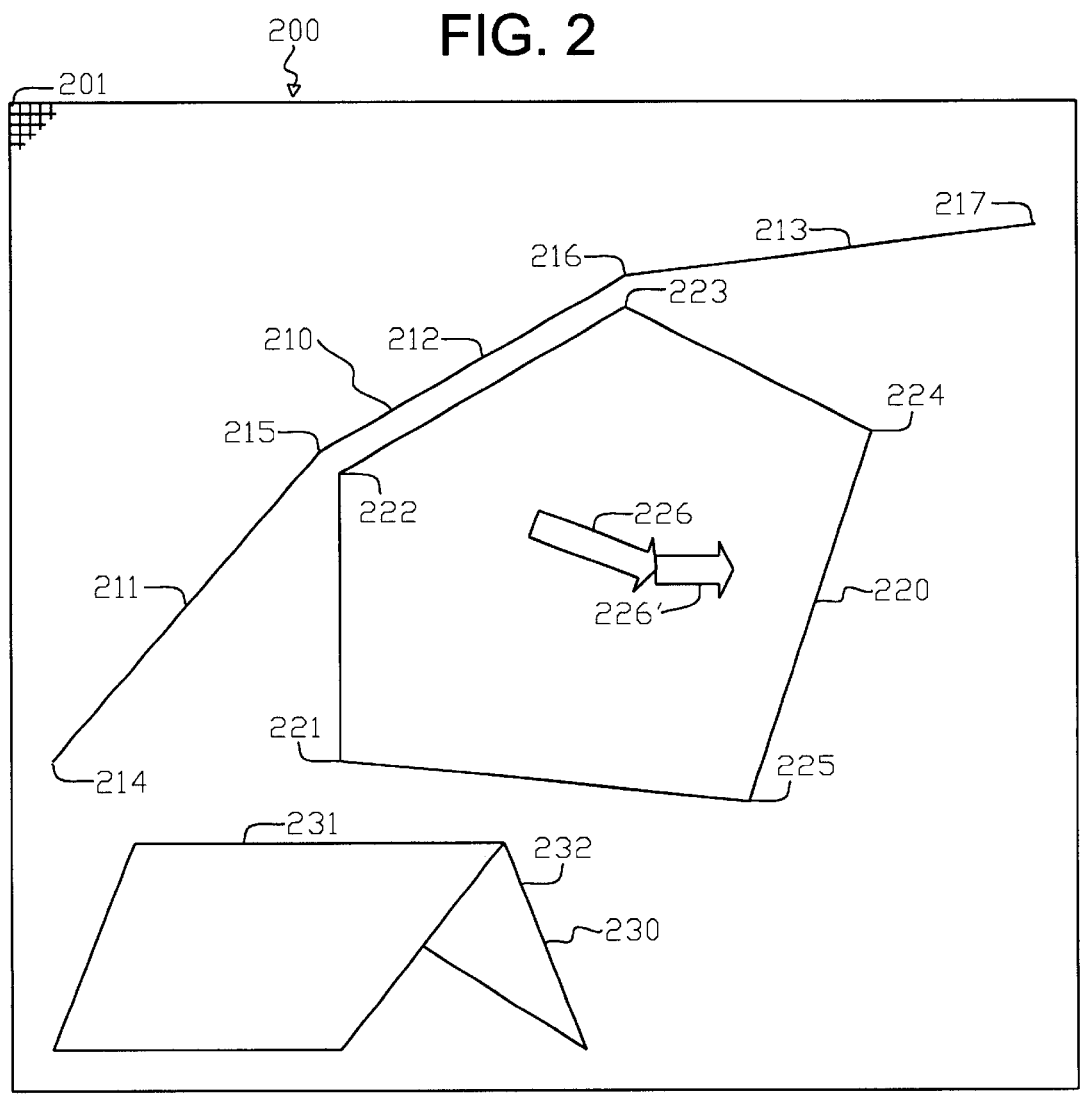

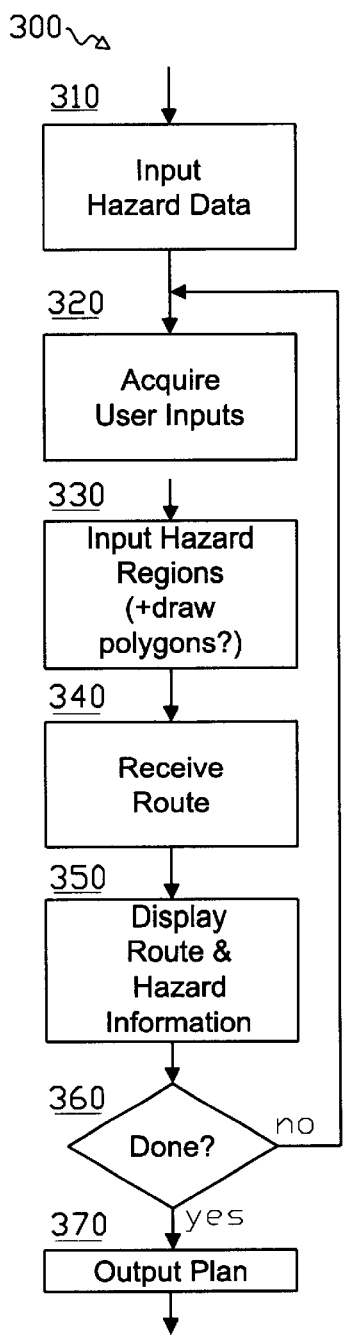
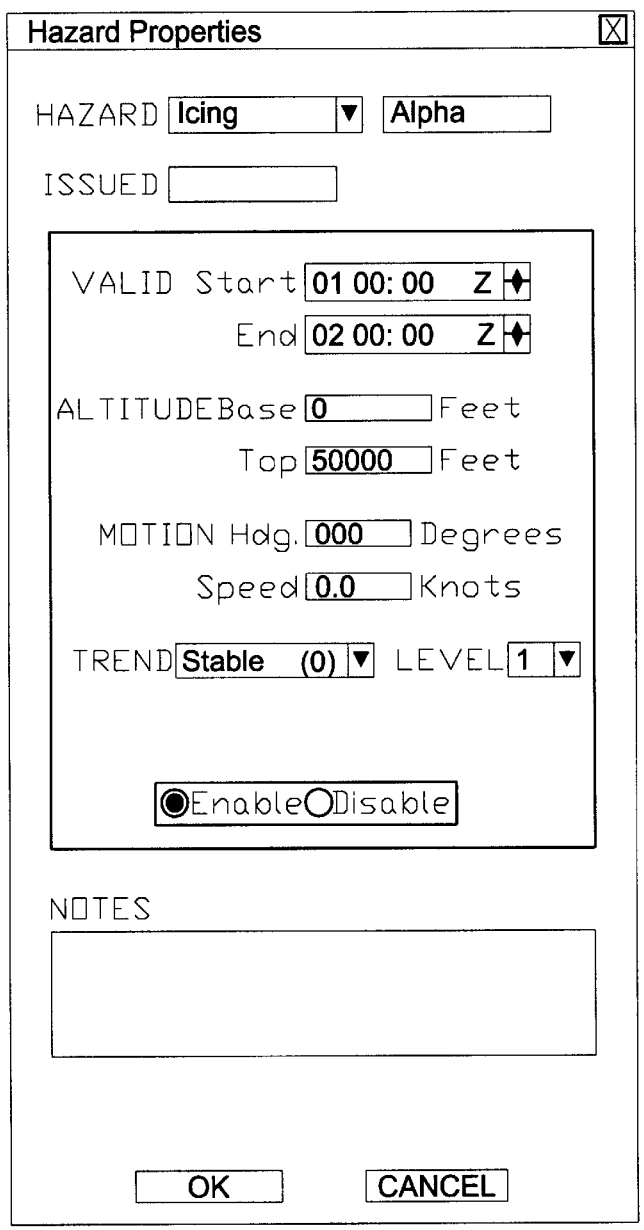

INTERFACES FOR PLANNING VEHICLE ROUTES

GOVERNMENT INTEREST

This invention was made with Government support under Cooperative Agreement No. NCC-1-291 awarded by NASA Langley Research Center. The Government may have certain rights in the invention.

TECHNICAL FIELD

The present invention relates to vehicle navigation, and more particularly concerns the planning of aircraft routes, including display and user interaction.

BACKGROUND

The aviation community has a goal of reducing the fatal-accident rate by eighty percent within the next ten years. At the same time, air traffic continues to increase, and the national airspace system is undergoing major changes. In particular, it is likely that aircraft pilots will be given more responsibility for avoiding hazards themselves.

Weather is a factor in a third of aircraft accidents. The National Aeronautics and Space Administration (NASA) is presently embarked upon a multi-year effort to provide better weather information and to improve hazard characterization, condition monitoring, data display, and decision support. At the present time, controllers, dispatchers, and air-traffic managers have access to a number of weather-information products from private vendors and from government services. Graphic displays of weather information on large airliners are limited to onboard weather radars and information from paper weather briefings. En-route updates are delivered either as voice messages via radio or as alphanumeric data-link printouts onboard the aircraft.

Flight planning is a complex task. A strategic planning and replanning tool produces a flight plan that describes the track, speed, and altitude that an aircraft will fly during various phases of an entire flight. Because the underlying models and assumptions made in a completely automated system may be incomplete or fallible, some have suggested the broad concept of a cooperative planner that interacts with a human operator. Pilots and dispatchers alike have stated that merely providing additional hazard information would not adequately support effective decision-making for routing choices. A need therefore remains for more advanced facilities for generating and modifying route plans for aircraft, both for increased safety and for better ease of use.

SUMMARY OF THE INVENTION

The present invention offers systems and methods for producing routes for aircraft and similar vehicles in response to a number of factors, including weather hazards and other in-flight conditions.

The invention offers systems and methods for interactive route planning in the face of weather and other hazards. It also furnishes data representations and models for factors that influence route planning, such as arrival time, fuel efficiency, passenger comfort, overflight fees, and conditions at terminals, including traffic congestion and closure of runways and other facilities. It further supplies an interface for facilitating the display of in-flight condition data and the manipulation of the route. It can optionally be used with a route optimizer for modifying computer-generated proposed routes.

The invention achieves these and other objectives by displaying hazards of different types in response to received data and defining boundaries and/or other specifications characterizing the hazards for purposes of the flight plan. Controls permit a user to modify the displayed data and to manipulate the route.

DRAWING

FIG. 1 is a high-level block diagram of a system according to the invention.

FIG. 2 is a schematic diagram showing data representations used in the invention.

FIG. 3 is a high-level flowchart showing the operation of the system of FIG. 1.

FIG. 5 shows a properties box for the display of FIG. 4.

DETAILED DESCRIPTION

Figure 4:
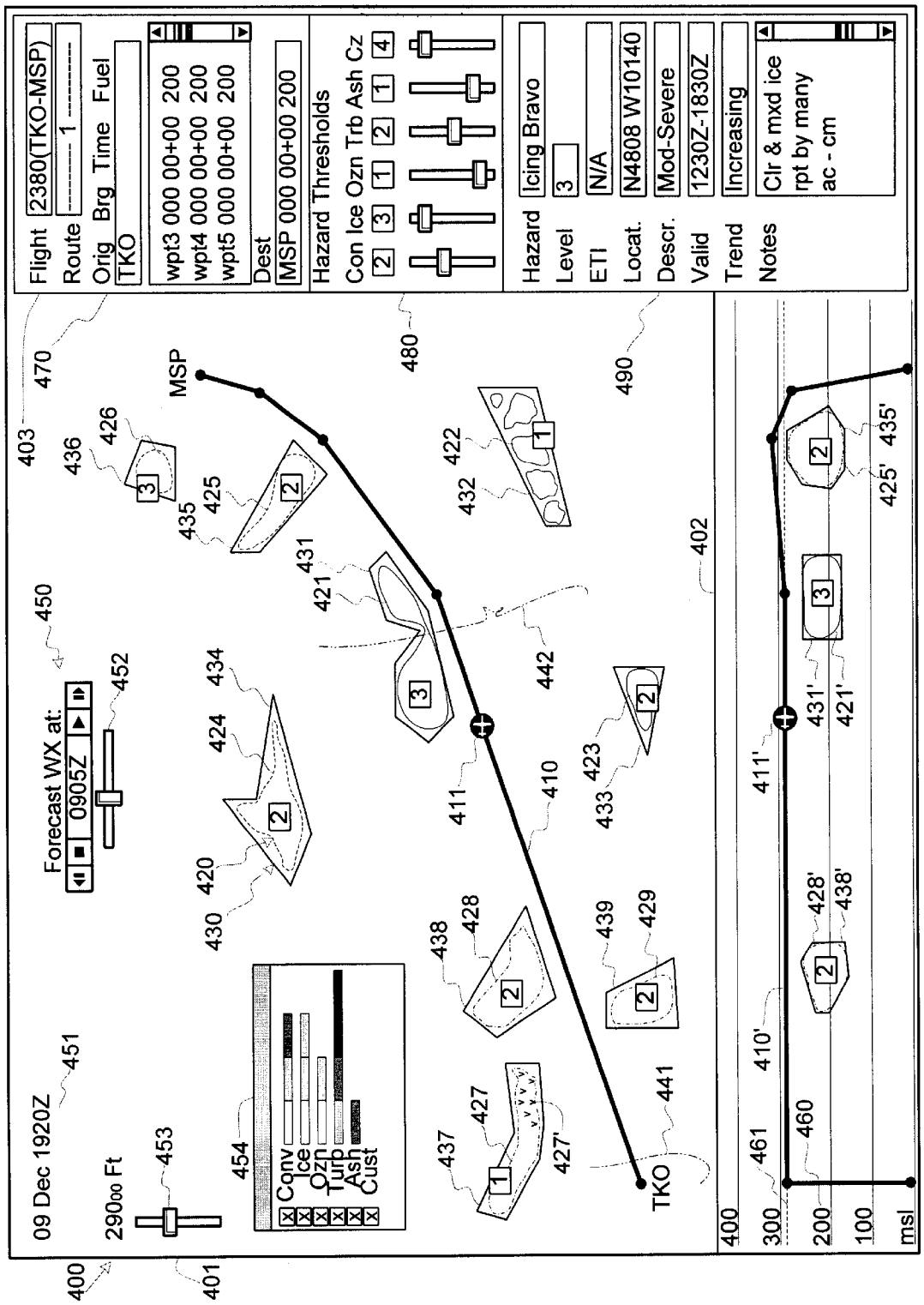
FIG. 4 is a diagram of a computer display for the system of FIG. 1.

This description and the accompanying drawing illustrate specific embodiments in which the present invention can be practiced, in enough detail to allow those skilled in the art to understand and practice the invention. Other embodiments, including logical, electrical, and mechanical variations, are within the skill of the art. Other advantages and features of the invention not explicitly described will also appear to those in the art. The scope of the invention is to be defined only by the appended claims, and not by the specific embodiments described below.

FIG. 1 is a high-level block diagram of a system 100 for manipulating flight-plan information according to the invention. Block 110 is a structure for data representing a flight plan or intended route. Block 120 contains data representing one or more hazards associated with the flight plan. Computer program code 130 implements an interface for entering data into and displaying the data from blocks 110 and 120. Route source 140 can be an optimizer containing computer program code for automatically generating flight plans to minimize a cost function that includes fuel, flight length, and/or other factors in the presence of hazards or other constraints. U.S. patent application Ser. No. 09/372,632, "Hazard Detection for Flight Plans and the Like," by Stephen G. Pratt and Gary L. Hartmann, hereby incorporated by reference, describes an example of such an optimizer. More generally, block 140 can be considered to be any source of flight plans, including standardized plan templates and plans entered manually in interface 130 by a user. Blocks 110–140 can form a part of a computer of any convenient type, general-purpose or special-purpose, such as the personal computer shown at 150, having devices 151–153 for entering and displaying data. Some or all of the data may come from an external source such as a weather service, and is input to computer 150 via a communications device 153. Code for implementing any of the functions of computer 150 may be represented on a medium such as signals from device 153 and/or stored on a medium such as a disk 154 external or internal to computer 150.

FIG. 2 is a schematic of a geographical area 200 illustrating data used in system 100. Flight plan 210 is represented as a sequence of segments 211–213 between preselected waypoints 214–217. The waypoints have both horizontal and vertical parameters; each is defined by a latitude, a longitude, and an altitude. The flight plan can be created by an operations center, a dispatcher, or a pilot, or by a computer program such as optimizer 140.

'Hazard' is a general term for any feature or condition to be avoided by the flight plan. Many of the significant hazards concern weather, e.g., convection, turbulence, and icing. Other atmospheric conditions include volcanic ash and stratospheric ozone concentrations. Political designations such as military training areas and areas having over-flight fees or restrictions can also be considered to be hazards. Any condition that can be represented to system 100 can in fact be a hazard in the present context. Hazard data can come from any number of sources, including fixed-base and on-board weather radar, private and governmental operations, and aviation charts. The present system also permits a system operator to enter hazard data and types directly via interface 130.

Hazards are instantiated as polygons such as 220. Polygons have compact representations in terms of vertex points or edge lines. They can be easily transformed to represent movement; and they can be generalized easily to three dimensions. A hazard polygon is defined in terms of the latitudes and longitudes of its vertices 221–225. The edges are great-circle connections between adjacent pairs of vertices. The number of edges is arbitrary. If desired, hazards can also be represented by polytopes (not shown) in three dimensions; the vertices then have altitude parameters as well. Hazard motion can be represented by a vector 226 that specifies the direction and velocity of the polygon's centroid. Additional vectors such as 226' can be added in a sequence to define a path over a certain time interval. This embodiment simplifies calculations by requiring that all polygons be convex. However, more complicated shapes such as 230 can be constructed from multiple convex polygons 231,232, etc. Each weather region or polygon also has an associated set of property data that includes the degree of its danger, such as severity, coverage, and forecast probability.

Because illustrative system 100 is a strategic planner that operates over an entire flight plan, the grid size 201 for representing features within area 200 varies with the length of the flight. In the interest of reducing calculations to a reasonable number, this embodiment is not constructed to thread its way through, say, one-km diameter convective cells on a coast-to-coast flight of 5000 km. Improvements in computing speed might, however, eventually allow the avoidance of individual small hazards, and even the integration of tactical aspects into the same system. The strategic nature of the system also results in prioritizing hazards that occur in the cruise phase of a flight. For example, although microbursts affect aircraft performance significantly, their effects usually occur at lower altitudes, in the take-off and landing phases, and they receive a lower level of attention in this implementation.

Some hazards, especially weather hazards, come in varying intensities. Rather than adding this complication to the process, this implementation considers only hazards that the operator considers dangerous, and permits the operator to set thresholds for different hazards, so that only those above the thresholds are displayed for consideration. This simplifies the data display for the user, allows more concrete control over an optimizer such as 140 through direct manipulation of the hazard boundaries, and permits clear visualization of routing decisions made by an optimizer. Moreover, sharp visible boundaries around hazards allow application of the same standards to multiple flights, and permit a user such as a dispatcher to better understand the effects of a (human or computer) routing decision for one flight on the operation of a fleet as a whole.

FIG. 3 shows the overall cycle 300 of system 100, FIG. 1. Block 310 acquires hazard data from an outside source such as those mentioned above. Block 320 acquires information from a user who manipulates interface 130 to create and delete hazard zones and types and to set thresholds for various types of hazard. Different flight conditions can be treated differently. For example, a cargo flight might elect to fly through a turbulent area that an airliner might wish to avoid in the interest of passenger comfort. Also, a pilot might decide to fly through an area of scattered convective activity and make small-scale lateral deviations to avoid isolated cells. On the other hand, an area of dense activity would be circumnavigated as a whole. There are common terms that can be employed for thresholding. For instance, 'isolated' activity refers to single cells, 'widely scattered' to activity occurring in 25% or less of an area, 'scattered' to up to 54%, and 'numerous' to 55% and more. Terms of probability are also in general use, such as 'slight chance' for 10–20% probability of precipitation, 'chance' for 30–50%, and 'occasional' for an activity that has at least 50% probability, but over less than half of the forecast period. These terms are not necessarily consistent among different conditions; e.g., 'occasional' turbulence occurs less than ⅓ of the time, while 'intermittent' occurs up to ⅔, and 'continuous' occurs above that amount. Some conditions are governed by airline policy, such as restricting passenger flights to altitudes below ozone concentrations above a toxic level. Other conditions, such as icing, are mandated for avoidance above certain levels. In addition, different icing restrictions apply to different aircraft; the present invention allows a dispatcher to set different restrictions such as icing on an aircraft-by-aircraft basis.

Block 330 generates the boundaries of hazard polygons such as areas 220 and 230, FIG. 2, from the information provided by blocks 310 and 320. Again, restricting the boundaries to convex polygons (or polytopes) simplifies calculations for the optimizer, but is not a requirement for the concept. Block 340 receives data representing a route. As noted above, routes can come from many different sources: an optimizer such as 140, a stored library of plans, or directly from a user input through interface 130. Block 350 displays the hazard areas and the computed flight plan via interface 130. Block 360 then iterates the cycle if the user so desires. Block 370 outputs information 110, FIG. 1, concerning the flight plan.

FIG. 4 shows a computer display 400 for interface 130, FIG. 1. Area 401 contains lateral schematic representations of route data 110, hazard data 120 on a background of geographical and other data useful for context. Area 402 is a representation of the route and hazard data in a vertical slice through the route. Area 403 contains representations of standard control icons for manipulating data representations in area 401. Display 400 integrates human factors and human-centered design strategies for ease of operation. The design of this embodiment uses current conventions adopted in the aircraft industry in order to maintain uniformity where feasible, but is not limited to those conventions where they do not serve the functionality of the present system. The overall display follows the "dark cockpit" philosophy that advocates subdued colors for normal operation, in order to reduce eyestrain and increase readability across a range of environmental conditions. Black is employed as a background color for the displayed elements, as is almost universal in aviation instrumentation. (FIG. 4 uses colors better adapted to clarity of exposition.)

Area 401 includes a map-like plan or lateral depiction of the geographic area of the flight, in this example, from Tokyo Narita (TKO) airport to Minneapolis-St. Paul Lindbergh (MSP) airport. For large geographic areas, the lateral depiction follows a modified conical projection, as employed by World Aeronautical Charts (WAC).

A proposed flight-plan route 410 has segments between a number of waypoints, shown respectively as heavy lines and small filled circles in FIG. 4. The data display does not directly show the altitudes of the waypoints in this view. Symbol 411 shows the aircraft position at the current time index. Multiple routes (not shown) can be displayed simultaneously, if desired, by using characteristics such as stippling to differentiate them from each other. A user can manipulate flight plan 410 by inserting mandatory or constrained waypoints, and by moving or deleting waypoints. Conventional clicking and dragging operations with a data-entry device 151 such as a mouse can realize such functions. The term "mouse" should be taken broadly to include any kind of cursor-positioning device, such as a trackball, joystick, etc.

Regions indicated collectively as 420 display the various types of hazards or other conditions to be avoided. The boundaries of hazards are shown by irregular lines. In the actual display, various types of hazards are shown in different colors or hues that are shaded to indicate severity. Specific colors and shades are selected to enhance visibility in the specific environment. For example, lighter shades indicate higher severity levels in display 400 in order to enhance contrast with the choice of a dark background. Also, because weather phenomena tend to occur in the same vicinity, hazard areas frequently cluster on the display. The drawing order of hazard regions therefore follow an assigned order of importance: volcanic activity highest, then level-3 convective activity, level-3 icing, level-4 turbulence, and level-2 ozone lowest. Color transparency (i.e., alpha axis) also facilitates the perception of multiple elements such as weather and land that might occur in the same location. Also, as described below, the operator can filter various phenomena to view only those of current interest. Display 400 includes all severity levels of the hazards, although some levels could be filtered out if desired. FIG. 4 depicts three illustrative kinds of hazard with different patterns on their boundary lines to symbolize the different colors: solid lines indicate convective weather, as at 421–423; dashed lines 424–426 are icing; and dot-dash lines 427–429 are turbulence. The boxed numerals associated with each region indicate the severity and/or probability of the hazard. A visual effect such as varying amounts of stippling could be used as at 427' to indicate greater or lesser areas of coverage of a hazard within the defined boundary.

Polygons or other boundaries 430 enclose hazard regions 420. An operator draws individual polygons 431–439 by selecting and dragging points with a mouse or other input device. Hazard polygons can also be drawn by operators other than the one constructing the flight plan, and can be automatically generated by a source that provides hazard information to system 100. Such hazards can also include properties in files that produce properties boxes. Some or all of this information can be included as default or nominal values.

A direction and/or rate of travel can be imparted to the polygon by selecting the center of the polygon and dragging a vector. A path of multiple successive vectors can also be entered. A single polygon can enclose multiple weather regions; polygon 432, for example encapsulates a squall line having multiple cells that are considered so closely spaced as to prohibit penetration of the entire region. Hazards other than those built into the system can be defined and entered as a "custom" type.

The operator can open a properties box for a polygon by double-clicking the polygon. FIG. 5 shows an example 500 of such a properties box. The operator can enter information associated with the hazard, including a name, a severity level, a description, times during which the hazard is valid, vertical dimensions, and notes. For moving hazards, the properties can include:

- An initial time value, at which the drawn vertices represent the position of the hazard. Typically this time value is in the future, and the vertex points incorporate weather-model or other forecast information.
- The position of a point that represents the center of motion of the hazard polygon.
- The heading and speed of the polygon's motion at the center position. The motion occurs along a great circle rather than along a rhumb line, so the direction changes over large distances.

Because hazard polygons move along great-circle paths, the display program transforms its coordinates from earth frame into a reference frame that coincides with the great circle, rotates it at an angle corresponding to the distance traveled at its specified speed, then transforms the coordinates back to the original earth frame for presentation in area 401. This embodiment employs a constant shape for moving hazard polygons. However it is possible to define multiple shapes for different times if desired. It is also possible to vary course, speed, and other properties over time if the added complexity is worthwhile.

Area 401 can also show geographic, topographical, political, and other features. Partial lines 441 and 442, for example, indicate coastlines for landmasses rendered in subdued transparent colors.

Area 401 can also include some data and control icons 450. Legend 451 shows the date and time of the flight. Movie-player control 452 of a conventional type indicates the current time index for depicting the positions of hazard shapes 420 and 430, and of aircraft symbol 411. The associated slider varies the time index under operator control, and the flight plan can be played through time with the conventional recorder-type buttons, thus animating the moving hazards and aircraft symbol. The buttons select continuous play, pause, beginning, and end. Control 453 shows and modifies the altitude of the horizontal slice of airspace being shown in area 401; full slider displacement shows all altitudes.

Floating window 454 contains controls and color/shading conventions for the various types of hazards. The text labels name the hazard types, and include an operator-defined 'custom' type. The bars represent the hue used to designate each type of hazard in regions 420 and polygons 430, and the shadings used to indicate different severity levels of each hazard. (For clarity, color designations have been omitted from the regions and polygons in FIG. 4.) The check-boxes in window 454 permit an operator to select whether hazards of the corresponding type are to be displayed or not.

Area 402 is a vertical depiction of the route, taken through a slice along the segments of flight plan 410', and includes the waypoints and aircraft position indicator 411'. The vertical scale is exaggerated greatly over the horizontal scale. Light horizontal lines 460 denote altitude increments above mean sea level, marked in flight levels (i.e., hundreds of feet). The level of dashed line 461 is set by the altitude slider of control 453. The vertical projections of hazard areas 421', 425', and 428' and their polygons 431', 435', and 438' that intersect route 410' are shown in area 402.

Area 403 contains data values and control structures that affect the flight plan. General information identifying the flight and a route iteration number are contained in general-information cluster 470. The operator can select a flight, and select among several alternative routes with drop-down combination boxes. This subarea also includes information concerning the origin, destination and waypoints. A scrollbox contains information relating to waypoints, such as their names ("wpt3," etc.), bearings, estimated times en route, and remaining fuel. The user can enter required times of arrival (RTA), altitudes, and other constraints here as well. Threshold cluster 480 includes sliders for permitting an operator to set threshold severity values for a number of different types of hazard, such as convective weather ("Con"), icing ("Ice"), ozone concentrations ("Ozn"), turbulence ("Trb"), volcanic ash ("Ash") and custom zone ("Cz"). Recommended maximum values appear in boxes above their respective sliders. A user drags the sliders to set threshold values that the user wishes the flight plan to avoid. These values can be communicated to optimizer 140.

Subarea 490 contains information regarding one of the hazard regions 421–429, in response to a single mouse click over its corresponding polygon 431–439. FIG. 4 shows the information for region 426, named "Icing Bravo" in the top entry of subarea 490. Other entries show a severity level and an estimated time of intercept with the flight path, the location of the center of the hazard polygon, the range of severity levels found within the hazard region, a time block during which the hazard exists, and the severity trend of the hazard. Users can enter time-stamped notes at the bottom of the subarea. Some of the other entries can also be edited by direct entry of data, although some are prohibited and others are constrained to certain data values. In the latter case, clicking and holding on the text field of an entry elicits a drop-down menu of possible values for that entry. Clicking and holding on the "Hazard" entry produces a drop-down of the names of all the displayed hazards, plus a "New Hazard" choice for adding a hazard to the display. Selecting any of the choices in the "Hazard" drop-down list also generates a properties box 500 for that hazard in area 401.

CONCLUSION

The invention presents systems and methods for displaying and manipulating routes for aircraft and other objects in the presence of hazards. Many variations and generalizations within the scope of the invention will occur to those skilled in the art. In particular, the term "flight plan" must be taken broadly to include routes for other vehicles, and similar plans for maneuvering in the presence of hazards. Likewise, hazards are broadly defined as conditions that might affect the plan of the route. Hazards can, for example include political and other zones in addition to weather and similar phenomena. This term can include regions that might be more desirable than surrounding regions (i.e., have a negative cost), rather than only regions that should be avoided entirely. Some hazards can be other than regions having a geographic extent or physical boundaries; for example, some intermediate stops might impose landing fees that increase the overall cost of a flight. Hazard boundaries or other designations can be indicated other than by polygons or other linear structures. Multiple nested polygons could represent different costs associated with different levels of a hazard region. The division of the described systems and methods into blocks in the above description does not imply that other divisions are not possible or desirable. Indications that some components or steps are convenient or preferred does not imply that others might not be desirable or within the scope of the claims. The sequence of blocks in the description and of recitations in the claims does not imply any particular time order.

We claim as our invention:

1. A method carried out by a programmed computer for planning routes by a user in the presence of hazards, comprising;
   receiving data representing a proposed route for a vehicle;
   receiving data representing hazards associated with the route, the hazards having a plurality of different types;
   displaying geographic representations of the route data and the hazard data together in the same presentation, the different types of hazards being represented differently from each other; and
   inputting specifications from the user for modifying the displayed representations of specified portions of the hazard data.

2. The method of claim 1 where the route is a flight plan for an aircraft.

3. The method of claim 2 where the flight plan includes a plurality of waypoints.

4. The method of claim 1 where the specifications include boundaries of areas representing at least one of the hazards.

5. The method of claim 4 where the boundaries are polygons.

6. The method of claim 1 where the specifications include data relating to motion of at least one of the hazards.

7. The method of claim 6 where the data relating to motion comprises direction and speed of the one hazard.

8. The method of claim 6 further comprising varying the time at which the hazards are depicted in the display.

9. The method of claim 1 where hazard types include weather hazards.

10. The method of claim 9 where the displayed hazard data represents different hazard intensities differently.

11. The method of claim 1 where the geographic representations are displayed in a lateral depiction.

12. The method of claim 1 where the geographic representations are displayed in a vertical depiction.

13. The method of claim 1 where inputting the specifications from the user comprises receiving inputs from a set of controls operable by the user.

14. The method of claim 13 where the controls include a control for varying the time at which the hazards are depicted in the display.

15. The method of claim 13 where the controls include at least one control to establish a threshold for an intensity of a hazard to be avoided by the route.

16. The method of claim 1 further comprising producing the received route data by optimizing a cost function for the route.

17. A medium containing program instructions for causing a suitably programmed digital computer to carry out a method for planning routes in the presence of hazards, the method comprising:
   receiving data representing a proposed route for a vehicle;
   receiving data representing hazards associated with the route, the hazards having a plurality of different types;
   displaying geographic representations of the route data and the hazard data together in the same presentation, the different types of hazards being represented differently from each other; and
   inputting specifications from the user for modifying the displayed representations of specified portions of the hazard data.

18. The medium of claim 17 where the medium comprises a storage medium.

19. The medium of claim 17 where the medium comprises signals.

20. A computer-implemented system for planning routes in the presence of hazards, comprising:

data representing a route for a vehicle;

data representing hazards with respect to the route, the hazards having a plurality of different types; and an interface including a geographic display of the hazard data and the route data together in the same presentation the different types of hazards being represented differently from each other, and controls for manipulating the route data and the hazard data, and for inputting specifications for modifying the displayed representations of data associated with at least some of the hazards.

21. The system of claim 20 where the vehicle is an aircraft.

22. The system of claim 20 where the specifications include boundaries of areas representing at least one of the hazards.

23. The system of claim 22 where the boundaries are polygons.

24. The system of claim 20 where the specifications include data relating to motion over time of at least one of the hazards.

25. The system of claim 24 where the data relating to motion comprises direction and speed of the one hazard over time.

26. The system of claim 20 where the route data includes data for a plurality of alternative routes.

27. The system of claim 20 where the route data includes a plurality of waypoints.

28. The system of claim 20 where hazard types include weather hazards.

29. The system of claim 28 where the displayed hazard data represents different hazard intensities differently.

30. The system of claim 20 where the geographic representations are displayed in a lateral depiction.

31. The system of claim 20 where the geographic representations are displayed in a vertical depiction.

32. The system of claim 20 where inputting the specifications from the user comprises receiving inputs from a set of controls operable by the user.

33. The system of claim 32 where the controls include a control for varying the time at which the hazards are depicted in the display.

34. The system of claim 32 where the controls include at least one control to establish a threshold for an intensity of a hazard to be avoided by the route.

35. The system of claim 20 further comprising an optimizer for producing the received route data.

36. Apparatus for manipulating a flight plan by a user, comprising:

means for receiving data representing an aircraft route;

means for receiving data representing hazards with respect to the route;

means for a user to input specifications of area boundaries to be associated with the hazards; and means for presenting geographic representations of the route data, the hazard data, and the boundaries.

37. The apparatus of claim 36 where the apparatus comprises a programmed computer.

38. The apparatus of claim 36 where the presenting means includes a visual display.

39. The apparatus of claim 36 where the input means includes a cursor-positioning device.

40. The apparatus of claim 36 where the hazard receiving means includes a communications device.

41. The apparatus of claim 36 further comprising an optimizing means for minimizing the cost of the route in response to the specifications input by the user.

42. A computer-implemented system for planning routes (410), in which data (110) associated with a route and data (120) associated with hazards are represented on an interface (130), characterized in that the interface displays the route data and the hazard data together geographically (401, 402) and includes controls (450, 480) for manipulating the displayed route (410) and hazards (420).

43. A system according to claim 42, characterised in that the user controls include boundaries (430) of areas representing at least one of the hazards.

44. A system according to claim 43, characterized in that the boundaries are polygons.

45. A system according to claim 43, characterised in that the user controls include motion parameters (226) of at least one of the hazards.

46. A system according to claim 42, characterised in that different types of weather hazards are displayed differently.

47. A system according to claim 42, characterised in that different intensities of the same weather hazards are displayed differently.

48. A system according to claim 42, characterised in that the user can set a number of thresholds for different types of the weather hazards.

49. A system according to claim 42, characterized in that the geographic display is a lateral depiction (401).

50. A system according to claim 42, characterized in that the geographic display is a vertical depiction (402).

51. A system according to claim 42, characterized in that the hazard data is displayed temporally as well as geographically.

52. A system according to claim 42, characterized in that the route data is optimized while avoiding at least certain of the hazards.

53. A system according to claim 52, characterized in that the route data has a minimum cost function with respect to certain factors.

* * * * *

UNITED STATES PATENT AND TRADEMARK OFFICE
CERTIFICATE OF CORRECTION

PATENT NO. : 6,289,277 B1  Page 1 of 1
APPLICATION NO. : 09/413959
DATED : September 11, 2001
INVENTOR(S) : Feyereisen et al.

It is certified that error appears in the above-identified patent and that said Letters Patent is hereby corrected as shown below:

At Column 10, line 16, Claim 42 cancel the text beginning with "42. A computer-implemented system" and ending on line 23 with "and hazards (420)." and insert the following claim:

--42. A computer-implemented system for planning routes (410), in which data (110) associated with a proposed route and hazard data (120) are represented on an interface (130),
      characterised in that the interface displays the route data and hazard data for multiple types of weather hazards together geographically (401,402) and includes user controls (450,480) for manipulating user-specifiable display characteristics of the hazards (420).--

Signed and Sealed this

Twenty-fifth Day of November, 2008

JON W. DUDAS
*Director of the United States Patent and Trademark Office*

(12) EX PARTE REEXAMINATION CERTIFICATE (8746th)
United States Patent
Feyereisen et al.

(10) Number: US 6,289,277 C1
(45) Certificate Issued: Dec. 13, 2011

(54) INTERFACES FOR PLANNING VEHICLE ROUTES

(75) Inventors: Thea Lynn Feyereisen, Hudson, WI (US); Christopher J. Misiak, St. Anthony, MN (US); Victor A. Riley, Shoreview, MN (US)

(73) Assignee: Honeywell Inc., Minneapolis, MN (US)

Reexamination Request:
No. 90/011,043, Jun. 15, 2010

Reexamination Certificate for:
Patent No.: 6,289,277
Issued: Sep. 11, 2001
Appl. No.: 09/413,959
Filed: Oct. 7, 1999

Certificate of Correction issued Nov. 25, 2008.

(51) Int. Cl.
*G08G 5/04* (2006.01)
*G06F 19/00* (2006.01)

(52) U.S. Cl. .......... 701/202; 340/945; 342/109
(58) Field of Classification Search .......... None
See application file for complete search history.

(56) References Cited

To view the complete listing of prior art documents cited during the proceeding for Reexamination Control Number 90/011,043, please refer to the USPTO's public Patent Application Information Retrieval (PAIR) system under the Display References tab.

*Primary Examiner*—Jeffrey R. Jastrzab

(57) ABSTRACT

A system for producing vehicle routes such as aircraft flight plans in the presence of weather and other hazards defines static and moving hazards with polygons drawn on a display containing graphic hazard regions. Different hazard types and intensities are displayed differently. Both lateral and vertical geographic depictions are displayed, and hazards can be displayed temporally as well. Users input information and thresholds for hazards.

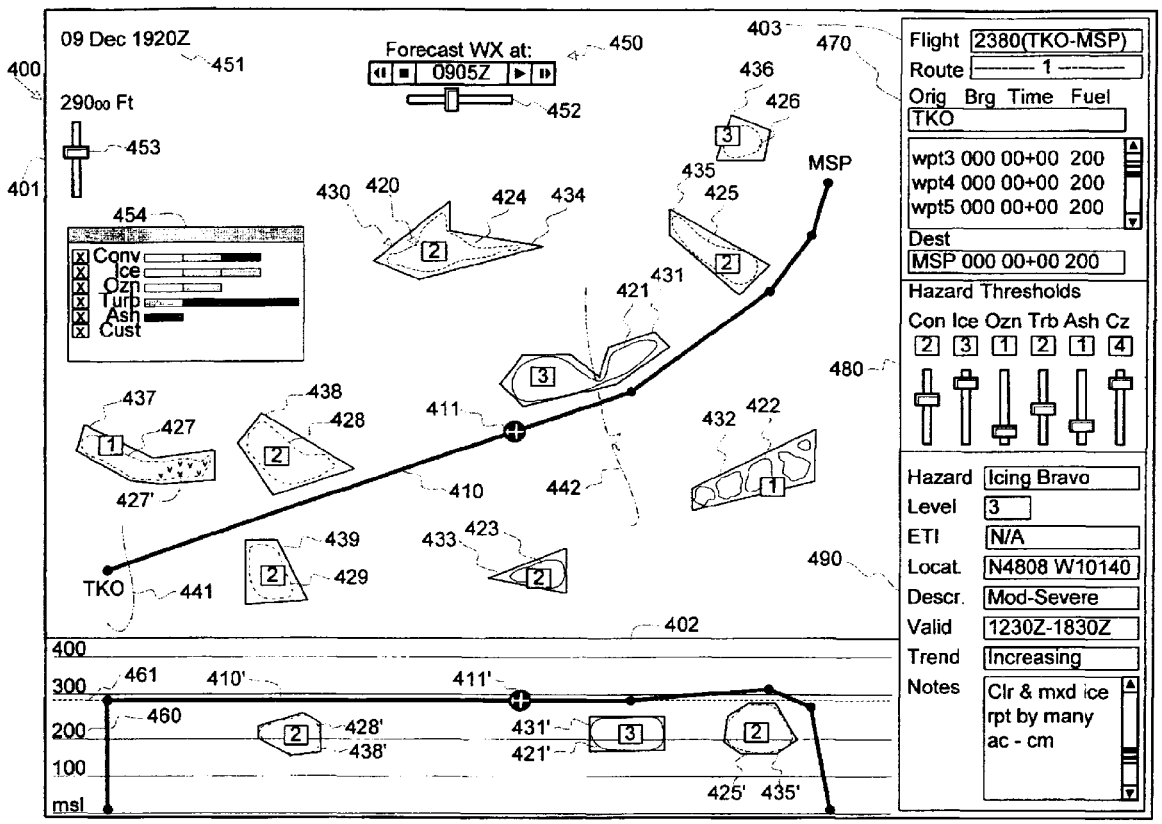

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 52 and 53 is confirmed.

Claims 1, 4-20, 22-35 and 42-51 are cancelled.

New claims 54-78 are added and determined to be patentable.

Claims 2, 3, 21 and 36-41 were not reexamined.

54. *The method of claim 1, wherein said specifications from the user for modifying the displayed representations of specified portions of the hazard data includes adjusting the transparency of at least one displayed hazard.*

55. *The method of claim 1, wherein the specifications input from the user allow the user to set a threshold, and wherein at least some of the hazard data is filtered so that only hazards above the user defined threshold are displayed on the displayed presentation.*

56. *The method of claim 1, wherein the specifications input from the user allow the user to set a threshold relating to a degree of danger posed by a type of hazard, wherein at least some of the hazard data is filtered so that only hazards having a greater severity than the user defined threshold are displayed on the displayed presentation.*

57. *The method of claim 1 wherein at least one of the hazards comprises convective activity, and wherein the specifications input from the user modify the displayed representations of the convective activity by filtering specified portions of the convective activity so that only convective acitivity having a severity greater than a threshold value are displayed on the displayed presentation.*

58. *The method of claim 1 wherein at least one of the hazards comprises turbulence, and wherein the specifications input from the user modify the displayed representations of the turbulence by filtering specified portions of the turbulence having a severity below a threshold value from the displayed presentation.*

59. *The medium of claim 17, wherein the specifications input from the user allow the user to set a threshold, and wherein at least some of the hazard data is filtered so that only hazards above the user defined threshold are displayed on the displayed presentation.*

60. *The medium of claim 17 wherein at least one of the hazards comprises convective activity, and wherein the specifications input from the user modify the displayed representations of the convective activity in real time by filtering specified portions of the convective activity so that only convective activity having a severity greater than a threshold value are displayed on the displayed presentation.*

61. *The system of claim 20, wherein the specifications input from the user allow the user to set a threshold, and wherein the hazard data is filtered so that only hazards above the user defined threshold are displayed on the geographic display.*

62. *The system of claim 20, wherein the specifications input from the user allow the user to set a threshold relating to a degree of danger posed by a type of hazard, wherein the hazard data is filtered so that only hazards having a greater severity than the user defined threshold are displayed on the geographic display.*

63. *The system of claim 42, characterized in that the route data is optimized to automatically select the proposed route such that the proposed route avoids at least certain of the hazards.*

64. *The system of claim 42 further comprising a route optimizer configured to optimize the proposed route based at least in part on the hazard data and to automatically select an optimized route that avoids at least certain of the hazards.*

65. *The system of claim 42, wherein the user-specifiable display characteristics comprise a user-defined threshold, and wherein at least some of the hazard data is filtered so the only hazards above the user defined threshold are displayed on the interface.*

66. *The system of claim 42, wherein the user-specifiable display characteristics comprise a user-defined threshold relating to a degree of danger posed by a type of hazard, and wherein at least some of the hazard data is filtered so that only hazards having a greater severity than the user defined threshold are displayed on the interface.*

67. *The system of claim 42 wherein the user-specifiable display characteristics modify the displayed representations of the at least one of the multiple types of weather hazards by filtering specified portions of the weather hazard so that only hazards having a severity greater than a threshold value are displayed on the interface.*

68. *A method carried out by a programmed computer for planning routes by a user in the presence of hazards, comprising:*

*receiving data representing a proposed route for a vehicle;*

*receiving real-time hazard data representing hazards associated with the route, the hazards having a plurality of different types;*

*displaying geographic representations of the route data and the real-time hazard data together in the same presentation, the different types of hazards being represented differently from the each other; and*

*inputting specifications from the user for modifying the displayed representations of specified portions of the real-time hazard data, wherein said specifications from the user for modifying the displayed representations of specified portions of the real-time hazard data includes adjusting the transparency of at least one displayed hazard.*

69. *A method carried out by a programmed computer for planning routes by a user in the presence of hazards, comprising:* receiving data representation a proposed route for a vehicle;

receiving real-time hazard data representing hazards associated with the route, the hazards having a plurality of different types;

displaying geographic representations of the route data and the real-time hazard data together in the same presentation, the different types of hazards being represented differently from each other; and inputting specifications from the user for modifying the displayed representations of specified portions of the real-time hazard data, wherein inputting the specifications from the user comprises receiving inputs from a set of controls operable by the user, wherein the controls include at least one control to establish a threshold for the severity of a hazard to be avoided by the route, wherein said controls allow a user to set a threshold for at least one of the hazards to conceal a portion of said hazard relative to the threshold setting, and wherein the hazard data is filtered so that only hazards above the user defined threshold are displayed.

70. A medium containing program instructions for causing a suitably programmed digital computer to carry out a method for planning routes in the presence of hazards, the method comprising:

receiving data representing a proposed route for a vehicle;

receiving real-time data representing hazards associated with the route, the hazards having a plurality of different types:

displaying geographic representations of the route data and the hazard data together in the same presentation, the different types of hazards being represented differently from each other; and inputting specfications from the user for modifying the displayed representations of specified portions of the hazard data, wherein said specifications from the user for modifying the displayed representations of specified portions of the real-time hazard data includes adjusting the transparency of at least one displayed hazard.

71. A medium containing program instructions for causing a suitably programmed digital computer to carry out a method for planning routes in the presence of hazards, the method comprising:

receiving data representing a proposed route for a vehicle;

receiving real-time data representing hazards associated with the route, the hazards having a plurality of different types;

displaying geographic representations of the route data and the hazard data together in the same presentation, the different types of hazards being represented differently from each other; and inputting specifications from the user for modifying the displayed representations of specified portions of the hazard data, wherein inputting the specifications from the user comprises receiving inputs from a set of controls operable by the user, wherein said controls allow a user to set a threshold for at least one of the hazards to conceal a portion of said hazard relative to the threshold setting, and wherein the hazard data is filtered so that only hazards above the user defined threshold are displayed.

72. The medium of claim 71, wherein the threshold setting relates to the degree of danger posed by the hazard.

73. A computer-implemented system for planning routes in the presence of hazards, comprising:

data representing a route for a vehicle;

real-time data representing hazards with respect to the route, the hazards having a plurality of different types; and an interface including a geographic display of the hazard data and the route data together in the same presentation the different types of hazards being represented differently from each other, and controls for manipulating the route data and the hazard data, and for inputting specifications for modifying the displayed representations of data associated with at least some of the hazards, wherein said specifications for modifying the displayed representations of data associated with a least some of the hazards includes adjusting the transparency of at least one displayed hazard.

74. A computer-implemented system for planning routes in the presence of hazards, comprising:

data representing a route for a vehicle;

real-time data representing hazards with respect to the route, the hazards having a plurality of different types; and an interface including a geographic display of the hazard data and the route data together in the same presentation the different types of hazards being represented differently from each other, and controls for manipulating the route data and the hazard data, and for inputting specifications for modifying the displayed representations of data associated with at least some of the hazards, wherein at least some of the controls for manipulating the route data and the hazard data, and for inputting specifications for modifying the displayed representations of data associated with at least some of the hazards are operable by a user, wherein said controls allow a user to set a threshold for at least one of the hazards to conceal a portion of said hazard relative to the threshold setting, wherein the hazard data is filtered so that only hazards above the user defined threshold are displayed.

75. Apparatus for manipulating a flight plan by a user, comprising:

means for receiving data representing an aircraft route;

means for receiving real-time data representing hazards with respect to the route;

means for a user to input specifications of area boundaries to be associated with the hazards; and means for presenting geographic representations of the route data, the hazard data, and the boundaries, the apparatus further including means for a user to adjust the transparency of at least one hazard.

76. Apparatus for manipulating a flight plan by a user, comprising:

means for receiving data representing an aircraft route;

means for receiving real-time data representing hazards with respect to the route;

means for a user to input specifications of area boundaries to be associated with the hazards; and means for presenting geographic representations of the route data, the hazard data, and the boundaries, the apparatus further including control means for a user to input specifications for modifying the geographic representations of specified portions of the hazard data, wherein said control means allow the user to set a threshold for at least one of the hazards to conceal a portion of said hazard from the geographic representation relative to the threshold setting, wherein the hazard data is filtered so that only hazards above the user defined threshold are represented.

77. A computer-implemented system for planning routes (410), in which data (110) associated with a proposed route and hazard data (120) associated with real-time hazards are represented on an interface (130), characterized in that the interface displays the route data and the hazard data for multiple types of weather hazards together geographically (410, 420) and includes user controls (450, 480) for manipulating the user-specifiable display characteristics of the displayed route (410) and hazard regions (420), wherein said user controls (480) include a control for adjusting the transparency of at least one displayed hazard.

78. A computer-implemented system for planning routes (410), in which data (110) associated with a proposed route and hazard data (120) associated with real-hazards are represented on an interface (130), characterized in that the interface displays the route data and the hazard data for multiple types of weather hazards together geographically (410, 420) and includes user controls (450, 480) for manipulating the user-specifiable display characteristics of the displayed route (410) and hazard regions (420), wherein the interface (130) further includes user controls for modifying the displayed representations of specified portions of the hazard data, wherein said controls allow a user to set a threshold for at least one of the hazards to conceal a portion of said hazard relative to the threshold setting, wherein the hazard data is filtered so that only hazards above the user defined threshold are displayed.

* * * * *